(12) United States Patent
Xue et al.

(10) Patent No.: US 10,828,689 B2
(45) Date of Patent: Nov. 10, 2020

(54) WHEEL ENGRAVING EQUIPMENT

(71) Applicant: CITIC Dicastal CO., LTD, Qinhuangdao (CN)

(72) Inventors: Bowen Xue, Qinhuangdao (CN); Ruisong Tong, Qinhuangdao (CN); Qi Cang, Qinhuangdao (CN); Jiandong Guo, Qinhuangdao (CN)

(73) Assignee: CITIC DICASTAL CO., LTD, Hebei (CN)

( * ) Notice: Subject to any disclaimer, the term of this patent is extended or adjusted under 35 U.S.C. 154(b) by 326 days.

(21) Appl. No.: 15/941,161

(22) Filed: Mar. 30, 2018

(65) Prior Publication Data

US 2019/0193137 A1    Jun. 27, 2019

(30) Foreign Application Priority Data

Dec. 22, 2017    (CN) .......................... 2017 1 13987602

(51) Int. Cl.
| | | |
|---|---|---|
| *B21D 53/26* | (2006.01) | |
| *B21B 15/00* | (2006.01) | |
| *B23Q 7/04* | (2006.01) | |
| *B26D 3/08* | (2006.01) | |
| *B41K 3/36* | (2006.01) | |
| *B41K 3/62* | (2006.01) | |
| *B21H 1/00* | (2006.01) | |
| *B21C 51/00* | (2006.01) | |

(52) U.S. Cl.
CPC ........ *B21D 53/262* (2013.01); *B21B 15/0007* (2013.01); *B21C 51/005* (2013.01); *B21D 53/264* (2013.01); *B21H 1/00* (2013.01); *B23Q 7/046* (2013.01); *B26D 3/085* (2013.01); *B41K 3/36* (2013.01); *B41K 3/62* (2013.01)

(58) Field of Classification Search
CPC .... B21D 53/26; B21D 53/262; B21D 53/264; B21D 53/30; B21D 22/14; B21D 22/18; B21K 1/28; B21K 1/38; B21H 1/08; B44B 5/0009; B44B 5/0047
USPC ....................... 101/3.1, 5, 6, 22, 23; 29/894
See application file for complete search history.

(56) References Cited

U.S. PATENT DOCUMENTS

| | | | | |
|---|---|---|---|---|
| 1,256,072 A * | 2/1918 | Stevenson | ............... | E21B 7/025 173/190 |
| 1,566,158 A * | 12/1925 | Miller | ................... | B44B 5/0047 264/293 |
| 3,951,563 A * | 4/1976 | Ravenhall | .............. | G01B 7/315 408/1 R |
| 5,890,952 A * | 4/1999 | Beaupre | ................... | B24B 5/44 451/59 |
| 6,217,424 B1 * | 4/2001 | Stephens | ................. | B24B 27/04 451/254 |
| 6,802,128 B1 * | 10/2004 | Yang | ....................... | B44B 3/001 33/18.1 |
| 2001/0031614 A1 * | 10/2001 | Morkvenas | ............... | B24B 7/12 451/270 |

(Continued)

*Primary Examiner* — Adam J Eiseman
*Assistant Examiner* — Bobby Yeonjin Kim
(74) *Attorney, Agent, or Firm* — Calfee, Halter & Griswold LLP

(57) ABSTRACT

The present application discloses wheel engraving equipment, which includes a lower lifting system, lower flange engraving systems, inner rim engraving systems, a wheel positioning and clamping system, an upper lifting and rotating system, a synchronous clamping and rotating system and the like.

1 Claim, 2 Drawing Sheets

(56) References Cited

U.S. PATENT DOCUMENTS

2006/0042091 A1\* 3/2006 Luschei .................... B23B 1/00
29/894.35

\* cited by examiner

WHEEL ENGRAVING EQUIPMENT

CROSS-REFERENCE TO RELATED APPLICATIONS

This application claims priority to Chinese Patent Application No. 2017113987602, filed on Dec. 22, 2017, which is hereby incorporated by reference in its entirety.

TECHNICAL FIELD

The present application relates to engraving equipment, and specifically, to wheel rolling engraving equipment.

BACKGROUND ART

After a forged aluminum alloy wheel is machined, it needs to engrave corresponding information identifiers at the inner rim and the lower flange. The traditional engraving method is to engrave the corresponding part of the wheel with a pneumatic marker, but this method is very low in efficiency and unclear in engraving effect.

SUMMARY OF THE INVENTION

The aim of the present application is to provide wheel engraving equipment, which may be used for implementing rolling engraving on the inner rim of a wheel and the end face of a lower wheel flange and quickly changing the engraved content of the inner rim.

In order to fulfill the above aim, the technical solution of the present application is:

Wheel engraving equipment, includes a frame, cylinders I, a lower fixed plate I, lower guide posts, lower guide sleeves, a lower lifting plate, cylinders II, guide rails I, sliding plates I, guide posts I, guide sleeves I, servo electric cylinders I, a servo motor I, a fixed support, engraving rollers I, guide rails II, sliding supports, servo motors II, racks I, swivels, bottom plates, engraving rollers II, vertical plates, servo motors III, engraving rollers III, belt pulleys I, synchronous belts I, top plates, belt pulleys II, belt pulleys III, synchronous belts II, belt pulleys IV, a conical head, a guide sleeve II, a guide rail III, a sliding plate II, an upper fixed plate I, a cylinder III, a servo electric cylinder II, an upper rotating plate, a swivel II, an upper fixed plate II, servo electric cylinders III, a servo motor IV, an upper lifting plate, upper guide posts, upper guide sleeves, a cylinder IV, a servo motor V, a gear II, racks II, clamping jaws, a gear I, a lower fixed plate II, a gear III, racks III, guide rails IV, a left sliding plate, left shafts, left bearing seats, V-shaped rollers, right shafts, right bearing seats, a right sliding plate, a cylinder V, a servo motor VI and the like.

A lower lifting system includes: the two cylinders I and the four lower guide sleeves are all fixed on the lower fixed plate I, and the four lower guide posts are matched with the lower guide sleeves and are fixed below the lower lifting plate; and output ends of the cylinders I are articulated with the lower part of the lower lifting plate.

A lower flange engraving system includes: the sliding plate I is mounted above the lower lifting plate via the guide rail I; the servo electric cylinder I is fixed on the left side of the upper part of the lower lifting plate, and output end of the servo electric cylinder I is connected with the left side of the sliding plate I; the guide sleeve I is fixed above the sliding plate I; the outer side of the guide post I is matched with the inner wall of the guide sleeve I; the engraving roller I is mounted at the top of the guide post I; the cylinder II is fixed below the sliding plate I, and an output end of the cylinder II is connected with the lower end of the guide post I. This equipment includes a plurality of sets of lower flange engraving systems, which are uniformly distributed at the top of the lower lifting plate.

An inner rim engraving system includes: a bottom plate of the sliding support is mounted on the left side of the upper part of the fixed support via the guide rail II; the servo motor II is fixed below a top plate of the sliding support; the bottom plate is mounted above the top plate of the sliding support via the swivel; the vertical plate is fixed above the bottom plate; the top plate is fixed above the vertical plate; the engraving roller II is mounted between the bottom plate and the top plate, and arranged on the left side of the vertical plate; the belt pulley I is mounted at the top of the engraving roller II; the servo motor III is fixed below the top plate and arranged on the right side of the vertical plate, and the belt pulley II and the belt pulley III are mounted at an output end of the servo motor III; the engraving roller III is also mounted between the bottom plate and the top plate, and arranged on the right side of the servo motor III; the belt pulley IV is mounted at the top of the engraving roller III; the belt pulley I is connected with the belt pulley II via the synchronous belt I; the belt pulley II is connected with the belt pulley III via the synchronous belt II; and this equipment includes a left inner rim engraving system and a right inner rim engraving system which are symmetric.

The two racks I are respectively fixed on the left and right sliding supports; the fixed support is mounted above the lower lifting plate; the servo motor I is fixed below the fixed support, and the gear I is fixed at an output end of the servo motor I; and the gear I is simultaneously engaged with the two racks I.

A wheel positioning and clamping system includes: the sliding plate II is mounted above the upper fixed plate I via the guide rail III; the guide sleeve II is fixed below the sliding plate II; the conical head is matched with the guide sleeve II; the cylinder III is fixed at the top of the sliding plate II, and an output end of the cylinder III is connected with the conical head; the servo electric cylinder II is fixed above the upper fixed plate I, and an output end of the servo electric cylinder II is connected with the sliding plate II; the servo motor V is fixed in the middle of the upper part of the upper fixed plate I, and the gear II is mounted at an output end of the servo motor V; the upper parts of the four clamping jaws are T-shaped, and matched with four T-shaped grooves uniformly distributed in the middle of the upper fixed plate I; four racks II are respectively fixed on the four clamping jaws; and the four racks II are simultaneously engaged with the gear II.

An upper lifting and rotating system includes: the upper rotating plate is fixed above the upper fixed plate I; the upper rotating plate is connected with the upper fixed plate II via the swivel II; the servo motor IV is fixed at the top of the upper fixed plate II, and an output end of the servo motor IV is connected with the upper rotating plate; two ends of the three servo electric cylinders III are respectively articulated with the two ends of the upper fixed plate II and the upper lifting plate; the four upper guide sleeves are fixed at the top of the frame; the four upper guide posts are matched with the upper guide sleeves and are fixed above the upper lifting plate; the cylinder IV is fixed at the top of the frame, and an output end of the cylinder IV is articulated with the top of the upper lifting plate.

A synchronous clamping and rotating system includes: the gear III is fixed above the lower fixed plate II; the left sliding plate is mounted above the lower fixed plate II via a guide rail IV; a rack III is fixed below the left sliding plate, and the two left bearing seats are fixed above the left sliding plate; the two left shafts are mounted inside the left bearing seats via bearings; two V-shaped rollers are respectively mounted above the two left shafts; the right sliding plate is mounted above the lower fixed plate II via a guide rail IV; a rack III is fixed below the right sliding plate, and the two right bearing seats are fixed above the right sliding plate; the rack III below the left sliding plate and the rack III below the right sliding plate are simultaneously engaged with the gear III; the two right shafts are mounted inside the right bearing seats via bearings; another two V-shaped roller are respectively mounted above the two right shafts; the servo motor VI is fixed below the right sliding plate, and an output end of the servo motor VI is connected with the lower end of one right shaft; the cylinder V is fixed on the right side of the frame, and an output end of the cylinder V is connected with the right sliding plate.

In the working process, the cylinder V drives the four V-shaped rollers via the gear III and the racks III to synchronously center a wheel; the servo motor IV drives the upper fixed plate I and the conical head via the swivel II to rotate; besides, the left-right position of the conical head is adjusted under the drive of the servo electric cylinder II by means of the guide rail III, and when the center of the conical head is just coaxial with the axis of one bolt hole, the conical head stops rotation and translation; the cylinder IV drives the conical head and the four clamping jaws via the upper guide posts to descend, and the posture of the upper fixed plate I is adjusted under the drive of the three servo electric cylinders III, so that the bottom surface of the upper fixed plate I is completely attached to the front side of the wheel; the positions of the four clamping jaws are adjusted under the drive of the servo motor V by means of the gear II and the racks II to support a center hole of the wheel tightly, and the cylinder III drives the conical head to descend to match the bolt hole of the wheel; the cylinder V drives the four V-shaped rollers via the gear III and the racks III to synchronously clamp the wheel, the servo motor VI drives the clamped wheel to rotate, and at the same time, the servo motor V also drives the wheel via the upper rotating plate, the clamping jaws and the conical head to rotate in the same direction; the servo motors III drive the engraving rollers II via the synchronous belts I to rotate, and drive the engraving rollers III via the synchronous belts II to rotate; the servo motors II drive the engraving rollers II and the engraving rollers III via the swivels to exchange the positions; when the cylinders I drive the inner rim engraving systems via the lower guide posts to ascend to appropriate positions in an inner rim, the inner rim engraving systems stop; the positions of the left and right inner rim engraving systems can be adjusted under the drive of the servo motor I via the gear I, the racks I and the guide rails II, the left and right engraving rollers II or engraving rollers III simultaneously contact the inner rim of the wheel and apply certain force, and rolling engraving on the inner rim of the wheel can be realized via rotation of the wheel and rotation of the left and right engraving rollers II or engraving rollers III; the horizontal positions of the engraving rollers I are adjusted to appropriate positions of the lower flange of the wheel under the drive of the servo electric cylinders I via the guide rails I; the cylinders II drive the engraving rollers I to ascend via the guide posts I, and when the engraving rollers I contact the end face of the lower flange of the wheel, rolling engraving can realized thereon.

The present application may be used for implementing rolling engraving on the inner rim of a wheel and the end face of a lower wheel flange and quickly changing the engraved content of the inner rim, and has the characteristics of high automation degree, advanced process, strong universality and high safety and stability at the same time.

Figure 1:
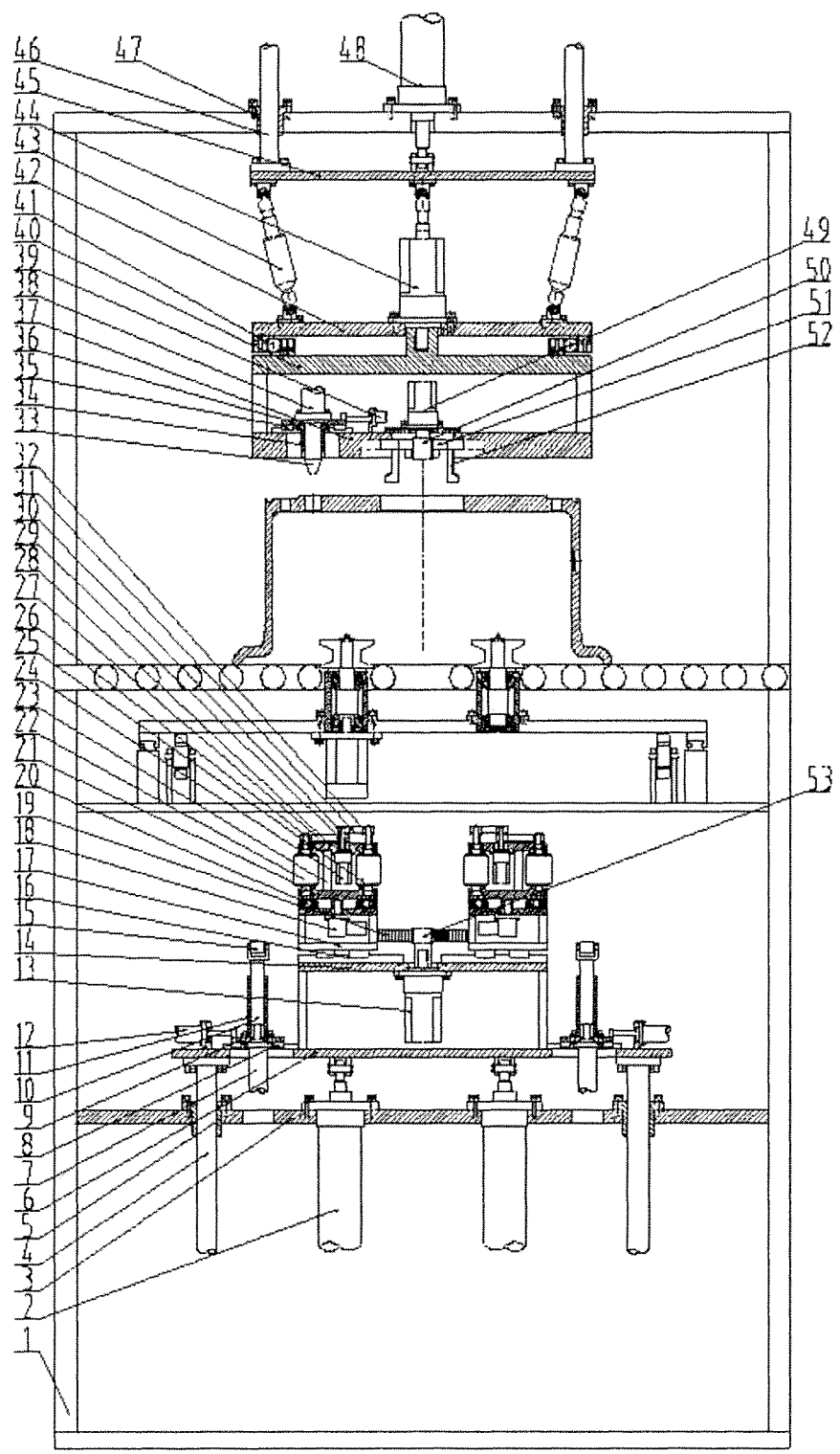
FIG. 1 is a front view of wheel engraving equipment of the present application.
Figure 2:
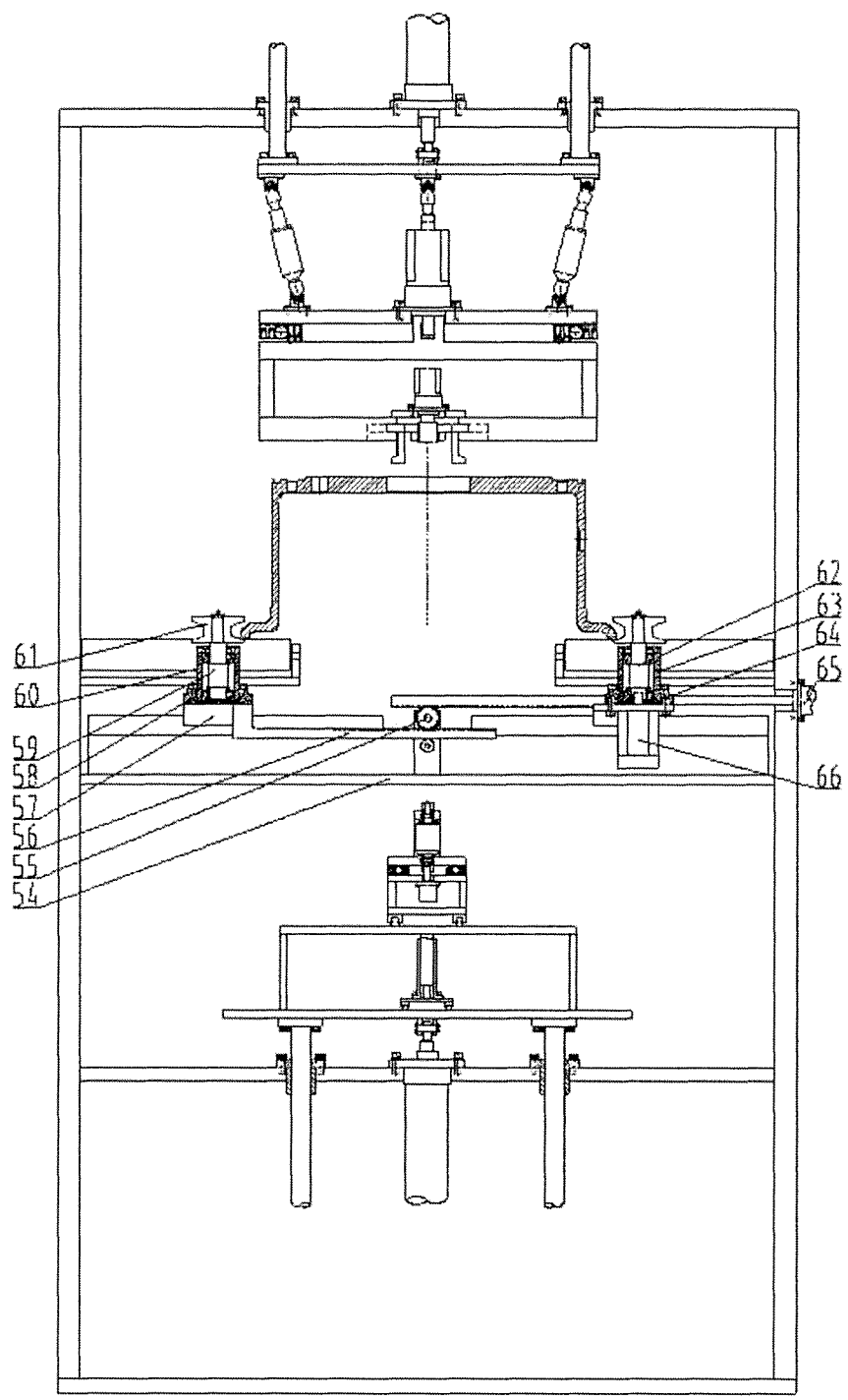
FIG. 2 is a left view of the wheel engraving equipment of the present application.

In which, 1—frame, 2—cylinder I, 3—lower fixed plate I, 4—lower guide post, 5—lower guide sleeve, 6—lower lifting plate, 7—cylinder II, 8—guide rail I, 9—sliding plate I, 10—guide post I, 11—guide sleeve I, 12—servo electric cylinder I, 13—servo motor I, 14—fixed support, 15—engraving roller I, 16—guide rail II, 17—sliding support, 18—servo motor II, 19—rack I, 20—swivel I, 21—bottom plate, 22—engraving roller II, 23—vertical plate, 24—servo motor III, 25—engraving roller III, 26—belt pulley I, 27—synchronous belt I, 28—top plate, 29—belt pulley II, 30—belt pulley III, 31—synchronous belt II, 32—belt pulley IV, 33—conical head, 34—guide sleeve II, 35—guide rail III, 36—sliding plate II, 37—upper fixed plate I, 38—cylinder III, 39—servo electric cylinder II, 40—upper rotating plate, 41—swivel II, 42—upper fixed plate II, 43—servo electric cylinder III, 44—servo motor IV, 45—upper lifting plate, 46—upper guide post, 47—upper guide sleeve, 48—cylinder IV, 49—servo motor V, 50—gear II, 51—rack II, 52—clamping jaw, 53—gear I, 54—lower fixed plate II, 55—gear III, 56—rack III, 57—guide rail IV, 58—left sliding plate, 59—left shaft, 60—left bearing seat, 61—V—shaped roller, 62—right shaft, 63—right bearing seat, 64—right sliding plate, 65—cylinder V, 66—servo motor VI.

DETAILED DESCRIPTION OF THE INVENTION

Details and working conditions of specific equipment provided by the present application will be described below in combination with the accompanying drawings.

The equipment includes a frame 1, cylinders I 2, a lower fixed plate I 3, lower guide posts 4, lower guide sleeves 5, a lower lifting plate 6, cylinders II 7, guide rails I 8, sliding plates I 9, guide posts I 10, guide sleeves I 11, servo electric cylinders I 12, a servo motor I 13, a fixed support 14, engraving rollers I 15, guide rails II 16, sliding supports 17, servo motors II 18, racks I 19, swivels 20, bottom plates 21, engraving rollers II 22, vertical plates 23, servo motors III 24, engraving rollers III 25, belt pulleys I 26, synchronous belts I 27, top plates 28, belt pulleys II 29, belt pulleys III 30, synchronous belts II 31, belt pulleys IV 32, a conical head 33, a guide sleeve II 34, a guide rail III 35, a sliding plate II 36, an upper fixed plate I 37, a cylinder III 38, a servo electric cylinder II 39, an upper rotating plate 40, a swivel II 41, an upper fixed plate II 42, servo electric cylinders III 43, a servo motor IV 44, an upper lifting plate 45, upper guide posts 46, upper guide sleeves 47, a cylinder IV 48, a servo motor V 49, a gear II 50, racks II 51, clamping jaws 52, a gear I 53, a lower fixed plate II 54, a gear III 55, racks III 56, guide rails IV 57, a left sliding plate 58, left shafts 59, left bearing seats 60, V-shaped rollers 61, right shafts 62, right bearing seats 63, a right sliding plate 64, a cylinder V 65, a servo motor VI 66 and the like.

A lower lifting system includes: the two cylinders I 2 and the four lower guide sleeves 5 are all fixed on the lower fixed plate I 3, and the four lower guide posts 4 are matched with the lower guide sleeves 5 and are fixed below the lower lifting plate 6; and output ends of the cylinders I 2 are articulated with the lower part of the lower lifting plate 6.

A lower flange engraving system includes: the sliding plate I 9 is mounted above the lower lifting plate 6 via the guide rail I 8; the servo electric cylinder I 12 is fixed on the left side of the upper part of the lower lifting plate 6, and an output end of the servo electric cylinder I 12 is connected with the left side of the sliding plate I 9; the guide sleeve I 11 is fixed above the sliding plate I 9; the outer side of the guide post I 10 is matched with the inner wall of the guide sleeve I 11; the engraving roller I 15 is mounted at the top of the guide post I 10; the cylinder II 7 is fixed below the sliding plate I 9, and an output end of the cylinder II 7 is connected with the lower end of the guide post I 10. This equipment includes a plurality of sets of lower flange engraving systems, which are uniformly distributed at the top of the lower lifting plate 6.

An inner rim engraving system includes: a bottom plate of the sliding support 17 is mounted on the left side of the upper part of the fixed support 14 via the guide rail II 16; the servo motor II 18 is fixed below a top plate of the sliding support 17; the bottom plate 21 is mounted above the top plate of the sliding support 17 via the swivel 20; the vertical plate 23 is fixed above the bottom plate 21; the top plate 28 is fixed above the vertical plate 23; the engraving roller II 22 is mounted between the bottom plate 21 and the top plate 28, and arranged on the left side of the vertical plate 23; the belt pulley I 26 is mounted at the top of the engraving roller II 22; the servo motor III 24 is fixed below the top plate 28 and arranged on the right side of the vertical plate 23, and the belt pulley II 29 and the belt pulley III 30 are mounted at an output end of the servo motor III 24; the engraving roller III 25 is also mounted between the bottom plate 21 and the top plate 28, and arranged on the right side of the servo motor III 24; the belt pulley IV 32 is mounted at the top of the engraving roller III 25; the belt pulley I 26 is connected with the belt pulley II 29 via the synchronous belt I 27; the belt pulley II 29 is connected with the belt pulley III 30 via the synchronous belt II 31; and this equipment includes a left inner rim engraving system and a right inner rim engraving system which are symmetric.

The two racks I 19 are respectively fixed on the left and right sliding supports 17; the fixed support 14 is mounted above the lower lifting plate 6; the servo motor I 13 is fixed below the fixed support 14, and the gear I 53 is fixed at an output end of the servo motor I 13; and the gear I 53 is simultaneously engaged with the two racks I 19.

A wheel positioning and clamping system includes: the sliding plate II 36 is mounted above the upper fixed plate I 37 via the guide rail III 35; the guide sleeve II 34 is fixed below the sliding plate II 36; the conical head 33 is matched with the guide sleeve II 34; the cylinder III 38 is fixed at the top of the sliding plate II 36, and an output end of the cylinder III 38 is connected with the conical head 33; the servo electric cylinder II 39 is fixed above the upper fixed plate I 37, and an output end of the servo electric cylinder II 39 is connected with the sliding plate II 36; the servo motor V 49 is fixed in the middle of the upper part of the upper fixed plate I 37, and the gear II 50 is mounted at an output end of the servo motor V 49; the upper parts of the four clamping jaws 52 are T-shaped, and matched with four T-shaped grooves uniformly distributed in the middle of the upper fixed plate I 37; four racks II 51 are respectively fixed on the four clamping jaws 52; and the four racks II 51 are simultaneously engaged with the gear II 50.

An upper lifting and rotating system includes: the upper rotating plate 40 is fixed above the upper fixed plate I 37; the upper rotating plate 40 is connected with the upper fixed plate II 42 via the swivel II 41; the servo motor IV 44 is fixed at the top of the upper fixed plate II 42, and an output end of the servo motor IV 44 is connected with the upper rotating plate 40; two ends of the three servo electric cylinders III 43 are respectively articulated with the two ends of the upper fixed plate II 42 and the upper lifting plate 45; the four upper guide sleeves 47 are fixed at the top of the frame 1; the four upper guide posts 46 are matched with the upper guide sleeves 47 and are fixed above the upper lifting plate 45; the cylinder IV 48 is fixed at the top of the frame 1, and an output end of the cylinder IV 48 is articulated with the top of the upper lifting plate 45.

A synchronous clamping and rotating system includes: the gear III 55 is fixed above the lower fixed plate II 54; the left sliding plate 58 is mounted above the lower fixed plate II 54 via a guide rail IV 57; a rack III 56 is fixed below the left sliding plate 58, and the two left bearing seats 60 are fixed above the left sliding plate 58; the two left shafts 59 are mounted inside the left bearing seats 60 via bearings; two V-shaped rollers 61 are respectively mounted above the two left shafts 59; the right sliding plate 64 is mounted above the lower fixed plate II 54 via a guide rail IV 57; a rack III 56 is fixed below the right sliding plate 64, and the two right bearing seats 63 are fixed above the right sliding plate 64; the rack III 56 below the left sliding plate 58 and the rack III 56 below the right sliding plate 64 are simultaneously engaged with the gear III 55; the two right shafts 62 are mounted inside the right bearing seats 63 via bearings; another two V-shaped rollers 61 are respectively mounted above the two right shafts 62; the servo motor VI 66 is fixed below the right sliding plate 64, and an output end of the servo motor VI 66 is connected with the lower end of one right shaft 62; the cylinder V 65 is fixed on the right side of the frame 1, and an output end of the cylinder V 65 is connected with the right sliding plate 64.

In the working process, the cylinder V 65 drives the four V-shaped rollers 61 via the gear III 55 and the racks III 56 to synchronously center a wheel; the servo motor IV 44 drives the upper fixed plate I 37 and the conical head 33 via the swivel II 41 to rotate; besides, the left-right position of the conical head 33 is adjusted under the drive of the servo electric cylinder II 39 by means of the guide rail III 35, and when the center of the conical head 33 is just coaxial with the axis of one bolt hole, the conical head 33 stops rotation and translation; the cylinder IV 48 drives the conical head 33 and the four clamping jaws 52 via the upper guide posts 46 to descend, and the posture of the upper fixed plate I 37 is adjusted under the drive of the three servo electric cylinders III 43, so that the bottom surface of the upper fixed plate I 37 is completely attached to the front side of the wheel; the positions of the four clamping jaws 52 are adjusted under the drive of the servo motor V 49 by means of the gear II 50 and the racks II 51 to support a center hole of the wheel tightly, and the cylinder III 38 drives the conical head 33 to descend to match the bolt hole of the wheel; the cylinder V 65 drives the four V-shaped rollers 61 via the gear III 55 and the racks III 56 to synchronously clamp the wheel, the servo motor VI 66 drives the clamped wheel to rotate, and at the same time, the servo motor V 49 also drives the wheel via the upper rotating plate 40, the clamping jaws 52 and the conical head 33 to rotate in the same direction; the servo motors III 24 drive the engraving rollers II 22 via the synchronous belts I 27 to rotate, and drive the engraving rollers III 25 via the synchronous belts II 31 to rotate; the servo motors II 18 drive the engraving rollers II 22 and the engraving rollers III 25 via the swivels 20 to exchange the positions; when the cylinders I 2 drive the inner rim engraving systems via the lower guide posts 4 to ascend to appropriate positions in an inner rim, the inner rim engraving systems stop; the positions of the left and right inner rim engraving systems can be adjusted under the drive of the servo motor I 13 via the gear I 53, the racks I 19 and the guide rails II 16, the left and right engraving rollers II 22 or engraving rollers III 25 simultaneously contact the inner rim of the wheel and apply certain force, and rolling engraving on the inner rim of the wheel can be realized via rotation of the wheel and rotation of the left and right engraving rollers II 22 or engraving rollers III 25; the horizontal positions of the engraving rollers I 15 are adjusted to appropriate positions of the lower flange of the wheel under the drive of the servo electric cylinders I 12 via the guide rails I 8; the cylinders II 7 drive the engraving rollers I 15 to ascend via the guide posts I 10, and when the engraving rollers I 15 contact the end face of the lower flange of the wheel, rolling engraving can realized thereon.

The foregoing descriptions of specific exemplary embodiments of the present application have been presented for purposes of illustration and description. They are not intended to be exhaustive or to limit the application to the precise forms disclosed, and obviously many modifications and variations are possible in light of the above teachings. The exemplary embodiments were chosen and described in order to explain certain principles of the application and their practical application, to thereby enable others skilled in the art to make and utilize various exemplary embodiments of the present application, as well as various alternatives and modifications thereof. It is intended that the scope of the application be defined by the Claims appended hereto and their equivalents.

What is claimed is:

1. Wheel engraving equipment, comprising a frame, two cylinders I, a lower fixed plate I, four lower guide posts, four lower guide sleeves, a lower lifting plate, cylinders II, guide rails I, sliding plates I, guide posts I, guide sleeves I, servo electric cylinders I, a servo motor I, a fixed support, engraving rollers I, guide rails II, sliding supports, servo motors II, racks I, swivels, bottom plates, engraving rollers II, vertical plates, servo motors III, engraving rollers III, belt pulleys I, synchronous belts I, top plates, belt pulleys II, belt pulleys III, synchronous belts II, belt pulleys IV, a conical head, a guide sleeve II, a guide rail III, a sliding plate II, an upper fixed plate I, a cylinder III, a servo electric cylinder II, an upper rotating plate, a swivel II, an upper fixed plate II, servo electric cylinders III, a servo motor IV, an upper lifting plate, upper guide posts, upper guide sleeves, a cylinder IV, a servo motor V, a gear II, racks II, clamping jaws, a gear I, a lower fixed plate II, a gear III, racks III, guide rails IV, a left sliding plate, left shafts, left bearing seats, V-shaped rollers, right shafts, right bearing seats, a right sliding plate, a cylinder V and a servo motor VI, wherein a lower lifting system comprises: the two cylinders I and the four lower guide sleeves are all fixed on the lower fixed plate I, and the four lower guide posts are matched with the four lower guide sleeves and are fixed below the lower lifting plate; and output ends of the two cylinders I are articulated with the lower part of the lower lifting plate;

a lower flange engraving system comprises: the sliding plate I is mounted above the lower lifting plate via the guide rail I; the servo electric cylinder I is fixed on the left side of the upper part of the lower lifting plate, and an output end of the servo electric cylinder I is connected with the left side of the sliding plate I; the guide sleeve I is fixed above the sliding plate I; the outer side of the guide post I is matched with the inner wall of the guide sleeve I; the engraving roller I is mounted at the top of the guide post I; the cylinder II is fixed below the sliding plate I, and an output end of the cylinder II is connected with the lower end of the guide post I; the wheel engraving equipment comprises a plurality of sets of the lower flange engraving systems, which are uniformly distributed at the top of the lower lifting plate;

an inner rim engraving system comprises: a bottom plate of the sliding support is mounted on the left side of the upper part of the fixed support via the guide rail II; the servo motor II is fixed below a top plate of the sliding support; the bottom plate is mounted above the top plate of the sliding support via the swivel; the vertical plate is fixed above the bottom plate; the top plate is fixed above the vertical plate; the engraving roller II is mounted between the bottom plate and the top plate, and arranged on the left side of the vertical plate; the belt pulley I is mounted at the top of the engraving roller II; the servo motor III is fixed below the top plate and arranged on the right side of the vertical plate, and the belt pulley II and the belt pulley III are mounted at an output end of the servo motor III; the engraving roller III is also mounted between the bottom plate and the top plate, and arranged on the right side of the servo motor III; the belt pulley IV is mounted at the top of the engraving roller III; the belt pulley I is connected with the belt pulley II via the synchronous belt I; the belt pulley II is connected with the belt pulley III via the synchronous belt II; and this wheel engraving equipment comprises two inner rim engraving systems, and the two inner rim engraving systems are symmetric;

the two racks I are respectively fixed on the left and right sliding supports; the fixed support is mounted above the lower lifting plate; the servo motor I is fixed below the fixed support, and the gear I is fixed at an output end of the servo motor I; and the gear I is simultaneously engaged with the two racks I;

a wheel positioning and clamping system comprises: the sliding plate II is mounted above the upper fixed plate I via the guide rail III; the guide sleeve II is fixed below the sliding plate II; the conical head is matched with the guide sleeve II; the cylinder III is fixed at the top of the sliding plate II, and an output end of the cylinder III is connected with the conical head; the servo electric cylinder II is fixed above the upper fixed plate I, and an output end of the servo electric cylinder II is connected with the sliding plate II; the servo motor V is fixed in the middle of the upper part of the upper fixed plate I, and the gear II is mounted at an output end of the servo motor V; the upper parts of the four clamping jaws are T-shaped, and matched with four T-shaped grooves uniformly distributed in the middle of the upper fixed plate I; four racks II are respectively fixed on the four clamping jaws; and the four racks II are simultaneously engaged with the gear II;

an upper lifting and rotating system comprises: the upper rotating plate is fixed above the upper fixed plate I; the upper rotating plate is connected with the upper fixed plate II via the swivel II; the servo motor IV is fixed at the top of the upper fixed plate II, and an output end of the servo motor IV is connected with the upper rotating plate; two ends of the three servo electric cylinders III are respectively articulated with the two ends of the upper fixed plate II and the upper lifting plate; the four upper guide sleeves are fixed at the top of the frame; the four upper guide posts are matched with the upper guide sleeves and are fixed above the upper lifting plate; the cylinder IV is fixed at the top of the frame, and an output end of the cylinder IV is articulated with the top of the upper lifting plate;

a synchronous clamping and rotating system comprises: the gear III is fixed above the lower fixed plate II; the left sliding plate is mounted above the lower fixed plate II via a guide rail IV; a rack III is fixed below the left sliding plate, and the two left bearing seats are fixed above the left sliding plate; the two left shafts are mounted inside the left bearing seats via bearings; two V-shaped rollers are respectively mounted above the two left shafts; the right sliding plate is mounted above the lower fixed plate II via a guide rail IV; a rack III is fixed below the right sliding plate, and the two right bearing seats are fixed above the right sliding plate; the rack III below the left sliding plate and the rack III below the right sliding plate are simultaneously engaged with the gear III; the two right shafts are mounted inside the right bearing seats via bearings; another two V-shaped rollers are respectively mounted above the two right shafts; the servo motor VI is fixed below the right sliding plate, and an output end of the servo motor VI is connected with the lower end of one right shaft; the cylinder V is fixed on the right side of the frame, and an output end of the cylinder V is connected with the right sliding plate;

in the working process, the cylinder V drives the four V-shaped rollers via the gear III and the racks III to synchronously center a wheel; the servo motor IV drives the upper fixed plate I and the conical head via the swivel II to rotate; besides, the left-right position of the conical head is adjusted under the drive of the servo electric cylinder II by means of the guide rail III, and when the center of the conical head is just coaxial with the axis of one bolt hole, the conical head stops rotation and translation; the cylinder IV drives the conical head and the four clamping jaws via the upper guide posts to descend, and the posture of the upper fixed plate I is adjusted under the drive of the three servo electric cylinders III, so that the bottom surface of the upper fixed plate I is completely attached to the front side of the wheel; the positions of the four clamping jaws are adjusted under the drive of the servo motor V by means of the gear II and the racks II to support a center hole of the wheel tightly, and the cylinder III drives the conical head to descend to match the bolt hole of the wheel; the cylinder V drives the four V-shaped rollers via the gear III and the racks III to synchronously clamp the wheel, the servo motor VI drives the clamped wheel to rotate, and at the same time, the servo motor V also drives the wheel via the upper rotating plate, the clamping jaws and the conical head to rotate in the same direction; the servo motors III drive the engraving rollers II via the synchronous belts I to rotate, and drive the engraving rollers III via the synchronous belts II to rotate; the servo motors II drive the engraving rollers II and the engraving rollers III via the swivels to exchange the positions; when the cylinders I drive the inner rim engraving systems via the lower guide posts to ascend to appropriate positions in an inner rim, the inner rim engraving systems stop; the positions of the left and right inner rim engraving systems can be adjusted under the drive of the servo motor I via the gear I, the racks I and the guide rails II, the left and right engraving rollers II or engraving rollers III simultaneously contact the inner rim of the wheel and apply certain force, and rolling engraving on the inner rim of the wheel can be realized via rotation of the wheel and rotation of the left and right engraving rollers II or engraving rollers III; the horizontal positions of the engraving rollers I are adjusted to appropriate positions of the lower flange of the wheel under the drive of the servo electric cylinders I via the guide rails I; the cylinders II drive the engraving rollers I to ascend via the guide posts I, and when the engraving rollers I contact the end face of the lower flange of the wheel, rolling engraving can be realized thereon.

\* \* \* \* \*